United States Patent Office 3,763,082
Patented Oct. 2, 1973

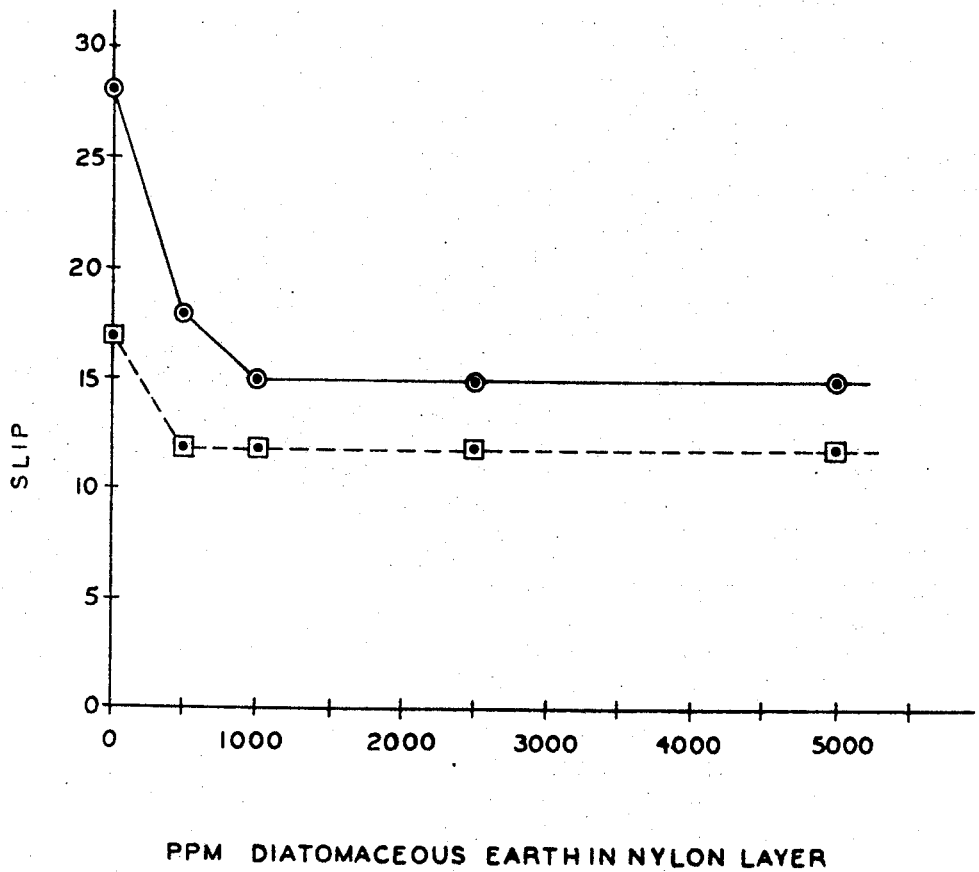

3,763,082
NYLON PACKAGING FILM WITH THERMALLY DEVELOPABLE SLIP
Bentley W. Elliott, Milwaukee, Wis., assignor to Milprint, Inc., Milwaukee, Wis.
Filed May 31, 1972, Ser. No. 258,146
Int. Cl. C08g 51/04
U.S. Cl. 260—37 N    2 Claims

ABSTRACT OF THE DISCLOSURE

Flexible packaging film having a substantially amorphous nylon layer, consisting of either a single layer or monofilm of nylon or a multiple-layer film having a nylon exterior layer, in which the nylon contains an inert micron-sized material such as diatomaceous earth, glass beads, colloidal silica or finely divided asbestos. A nylon layer of this type provides a flexible packaging film having a latent slip characteristic which becomes functional after the film is heated to its thermoelastic state.

BACKGROUND OF THE INVENTION

This invention relates to the art of packaging films having a nylon layer that is modified by incorporating additives therein to improve its performance on packaging machines.

Nylon may be utilized in flexible packaging films in a number of different forms. The nylon may be used by itself as a single layer monofilm; or the nylon may be laminated to one or more other films to form a multiple layer film in which the nylon is an exterior surface; or nylon may be extrusion coated onto other films to form a multiple-layer film in which the nylon is present as an exterior layer. The present invention relates to adding materials to the nylon for use in those flexible packaging films in which it is employed as a monofilm, or laminated or extrusion coated multiple-layer structure having a nylon exterior layer.

A nylon layer, whether as a monofilm or a portion of a multiple-layer structure, when extruded and quenched will form an amorphous tacky, stretchy material that lacks slip. Slip is herein defined as the ability of packages having a nylon exterior being able to freely move across other packages of the same film or other types of packaging films. This type of package-to-package contact may occur on a packaging machine or as the packages receive further handling such as in unloading and casing operations.

Some of the poor slip characteristics of extruded nylon can be overcome by moisturizing the film after it has been extruded, wrapping it into a roll and covering it, and then storing the roll while moist to thereby increase its crystallinity and lower its glass transition temperature, thereby enhancing its slip characteristic. However, this prior art system requires additional processing steps beyond the extrusion stage, and it is desired in accordance with my present invention to eliminate such additional processing steps and still produce nylon modified to have enhanced slip characteristics suitable for packaging operations which involve heating or heating and forming.

SUMMARY OF THE PRESENT INVENTION

Briefly, my invention comprises the addition to nylon of a micron-sized inert solid material such as finely divided diatomaceous earth, colloidal silica, finely divided asbestos, or glass beads. The finely divided solid is compounded with a thermoplastic carrier that is compatible with nylon; suitable such compounds include ethylene-vinyl acetate copolymer, nylon thermoplastic resins, ionomer resin, etc. The finely divided solid admixed with the thermoplastic carrier is blended with nylon resin, the entire mixture is loaded into the hopper of an extruder, and the blend is then melted and extruded to form a nylon layer containing the added materials.

The objects of my present invention are (1) to provide a packaging film having one or more nylon exterior layers wherein the nylon shows excellent slip characteristics when used on packaging machinery such as may arise in form-and-fill types of packaging operations, in which the packages are subject to heat, (2) to improve the package-to-package slip between contacting packages wrapped with a flexible packaging film incorporating a nylon exterior layer, (3) to provide a composition for extrusion into a nylon layer which will result in a nylon layer of excellent slip characteristics for packaging operations while eliminating additional processing steps following extrusion, (4) to provide a nylon packaging film of good slip characteristics which also has good gloss and clarity, (5) to provide packaging films employing nylon which are particularly useful in packaging machinery which involves thermoforming operations, (6) to improve the slip characteristic of substantially amorphous nylon, and (7) to provide the particular details of method and composition as hereinafter set forth in the claims.

BRIEF DESCRIPTION OF THE DRAWING

The following description of the present invention is made with reference to the accompaning drawing comprising a graph illustrating the slip characteristics of the films described in Example 1.

DESCRIPTION OF THE PREFERRED EMBODIMENTS

Example 1

Four different mixtures of pellets of nylon 6 and diatomaceous earth were blended together containing, respectively, on a weight basis 500 p.p.m., 1000 p.p.m., 2500 p.p.m., and 5000 p.p.m. of diatomaceous earth in the mixture. The diatomaceous earth was added in pellet form as 5 percent by weight solids carried in an ethylene-vinyl acetate copolymer thermoplastic (EVA) having 12 percent vinyl acetate and the balance ethylene. Each mixture was fed into an extruder, plasticized with heat and pressure and then extruded at 475° F. through a slot die onto a rotating chill roll to form a flat film. No further processing of the film was carried out after it was removed from the chill roll. The films made from these four mixtures are listed as Films 1, 2, 3 and 4 in the table below. The Control Film listed in the table was made from the same nylon 6, but did not contain any added diatomaceous earth.

All five films were stored in a meat cooler at 38° F. to simulate the moist, cool conditions that normally occur during packaging meat in a refrigerated plant. Samples of each film were removed from the meat cooler and heated to a thermoelastic state under a Calrod heater to thereby simulate the application of heat for thermoforming packages as may typically occur on a packaging machine used for meat packing. The films were then returned to the meat cooler and their slip measurements were taken by using an inclined plane (Cenco Cat. No. 75840) and a 500 gram sled with a 10 square inch surface area on its face which contacts the inclined plane. A sample of each film was attached to the sled and another to the inclined plane so that the slip measurement was made between two contacting nylon surfaces. Three samples of each film were tested for their static and kinetic slip in this fashion. Static slip as used herein is the angle of the inclined plane at which slippage starts between a nylon-to-nylon surface, with the weight of the sled being the only weight applied. The kinetic slip is the angle of the inclined plane at which the samples kept moving down the inclined plane after receiving a slight push, again with the slip being measured between the two nylon surfaces. The results tabulated in Table I below are the average of three samples for each film, and the slip values are the angle in degrees of the inclined plane at which movement was obtained as described above.

TABLE I.—SLIP MEASUREMENTS

| Film | Control | 1 | 2 | 3 | 4 |
|---|---|---|---|---|---|
| P.p.m. diatomaceous earth | 0 | 500 | 1,000 | 2,500 | 5,000 |
| Static slip | 28 | 18 | 15 | 15 | 15 |
| Kinetic slip | 17 | 12 | 12 | 12 | 12 |

The data of Table I is illustrated graphically in the accompanying drawing. Comparison of the results for the Control Film to the results for Films 1, 2, 3 and 4 show that the addition of diatomaceous earth to the nylon in accordance with this invention resulted in at least a 35 percent improvement in the static slip of the nylon and about a 30 percent improvement in its kinetic slip, the slip referring to the characteristic of movement between contacting nylon surfaces. Films 1, 2, 3 and 4 each have a nylon layer that showed excellent gloss and clarity at diatomaceous earth concentration levels up to about 1000 p.p.m., and good gloss clarity in excess of such concentration level. The nylon layer in the films of this example had a substantially amorphous structure.

Example 2

A mixture of nylon 6 and 625 p.p.m. diatomaceous earth was extrusion coated onto a substrate film. The substrate was Saran coated polyethylene film comprising a 2 mil thick layer of polyethylene and about a 0.3 mil thick layer of Saran. The diatomaceous earth was admixed with nylon as described in Example 1. The nylon layer was applied to the Saran coated polyethylene film substrate by means of the extrusion coating method described in my co-pending patent application Ser. No. 68,094 entitled Nylon Extrusion Coating, filed Aug. 31, 1970. No further processing of the nylon layer took place after it was joined to the substrate.

The film of this exaample was used on a vacuum forming machine similar to a Mahaffy-Harder Sureflow 614 to package frankfurters in a refrigerated plant. A web of the film was fed into the machine, heated to a thermoelastic state and vacuum formed into a tray-like container having a package compartment that was subsequently loaded with frankfurters. A second web of Saran coated polyester/polyethylene film was fed into the machine and heat sealed to the formed first web about the edges of the package compartment to complete the package. The nylon layer of the formed first web was on the exterior of the package. The completed packages were removed from the package-forming machine onto a take-off conveyor and transferred to either a packing table or to a banding operation.

The packages made with the film of this example showed excellent slip characteristics on the packing table of the machine in that there was no tendency for the packages to stick to one another as they accumulated or moved across the unloading table, and also in that the personnel removing the finished packages from the table could readily stack them into cases. In contrast, it was noted that filled packages made with the same film but in which there was no diatomaceous earth in the nylon would adhere to one another on the packing table and it was very difficult for the personnel unloading the machine to slide the packages across one another for stacking in a carton.

Packages from the take-off conveyor of the particular machine described in this example can also be transferred to an infeed conveyor for a banding operation in which the packages are moved onto a vertical elevator and a paper band is applied around their circumference. Package-to-package contact also occurs on the infeed conveyor since it moves continuously, but the elevator which removes the packages from it moves only intermittently. It was found that completed packages made with the nylon layer according to this example exhibited excellent slip and moved freely through this portion of the machine, but that the same film without any diatomaceous earth in the nylon layer resulted in packages that would stick to one another and prevent proper transport through the banding stage.

It was therefore concluded that the addition of the diatomaceous earth to the substantially amorphous nylon layer in the film of this example provided a flexible packaging film having substantially amorphous nylon that had excellent slip characteristics after the film was heated to the thermoelastic stage in the vacuum forming operation.

Flexible packaging films incorporating a nylon layer modified in accordance with this invention to include diatomaceous earth or a similar micron-sized finely divided inert solid material were observed to demonstrate excellent slip characteristics under the cool moist conditions that occur during meat packaging operations. Furthermore, the slip characteristic is present as a latent feature of the film inasmuch as it is not found when the film is at room temperature or normal operating temperature, but, instead, becomes developed after the film is heated to a thermoelastic state, such as occurs during thermoforming packaging operations. Once the film has been heated to exhibit thermoelasticity and then cooled, the slip characteristic is developed to its fully functional status. While this action is not precisely understood, it is felt that the materials added to the nylon to obtain this thermally developable slip feature have limited solubility in nylon in its amorphous condition such as is produced by extrusion, but that after the nylon is heated, crystalline growth occurs and such physical change in the nylon reduces the solubility of the admixed inert solid in the nylon to thereby develop the surface slip characteristic.

The nylon layer in a film according to this invention comprises an extruded nylon layer having a substantially amorphous structure, which term is used herein and in the claims to mean nylon that is more than 50% amorphous in structure. Substantially amorphous nylon will typically have 15–20% crystallinity, but this can increase on ageing. Suitable nylons include the commercially available extrudable film-grade nylon resins such as nylon made by the condensation of amino acids or their derivatives such as nylon 6, nylon 11 and nylon 12, as well as nylons of the diamine-dibasic acid type such as nylon 6/6, nylon 6/10, nylon 6/66 and nylon 6/610. In addition to the diatomaceous earth shown in the examples herein, colloidal silica, finely divided asbestos and micro-sized glass beads are other examples of micro-sized inert solid slip-producing materials which can be utilized as herein described. The inert solids can be mixed with a thermoplastic carrier that is compatible with nylon, such as an EVA copolymer, nylon, or ionomer thermoplastic.

Nylon modified in accordance with the present invention may be extruded as a single layer monofilm to be used for packaging or added as a layer joined to a substrate, and generally will be from 1 to 10 mils thick for most packaging applications, although thinner or thicker films may be employed in particular cases. The nylon modified as herein described may also be extrusion coated onto or laminated to other substrates to form multiple-layer films, and typical substrates include polyolefin films such as polyethylene, polypropylene, and biaxially oriented polypropylene; vinyl films; polyester films; cellophane films; and other flexible substrates typically used in flexible packaging. The substrates may be uncoated or coated with functional coatings such as Saran barrier layers, or with primer coatings intended to increase the adherence of the modified nylon layer applied thereto.

The micron-sized inert solid material is admixed with the nylon at a concentration level sufficient to be slip-producing after the nylon is heated to its thermoelastic state. The particular amount of the solid material that will be slip-producing may vary with the specific material used.

For example, at least about 500 p.p.m. of diatomaceous earth in the nylon layer will give excellent slip characteristics, and it is often preferred to add about 600 p.p.m. in order to assure that the slip characteristic is reliably reproduced. As indicated in the graphs of the accompanying drawing, the addition of larger amounts of slip-producing agent does not appear to increase the improvement in slip of the films once a suitable concentration has been reached.

This invention has been described with reference to certain specific embodiments in order to illustrate its practice, but it is expected that those skilled in the art will be able to devise other changes which will be within the true spirit and scope of this invention.

I claim:

1. A nylon flexible packaging film formed by the extrusion of a mixture of nylon resin and about 500–5,000 p.p.m. inert micron-sized solid diatomaceous earth into a film,
    (a) the nylon film being substantially amorphous,
    (b) the diatomaceous earth having been added to the nylon resin before its extrusion into the film, and
    (c) the film further characterized as having been heated to its thermoelastic state to develop increased slip greater than the slip of the film at normal operating temperatures prior to heating to said thermoelastic state.

2. A flexible packaging film comprising, in combination:
    (a) a substrate layer,
    (b) a nylon layer adhered to a surface of the substrate layer, said nylon layer characterized in that it is formed by the extrusion of a mixture of nylon resin and about 500–5,000 p.p.m. inert micron-sized solid diatomaceous earth, the diatomaceous earth having been added to the nylon resin before extrusion of said mixture, also characterized in that the nylon layer comprises substantially amorphous nylon, and further characterized as having been heated to its thermoelastic state to develop increased slip greater than the slip of the nylon layer at normal operating temperatures prior to heating to said thermoelastic state.

References Cited
UNITED STATES PATENTS

| | | | |
|---|---|---|---|
| 3,627,625 | 12/1971 | Jarett | 161—165 |
| 3,340,339 | 9/1967 | Ullman | 269—131 |
| 3,510,552 | 9/1970 | Tsuruta | 264—289 |
| 3,080,345 | 3/1963 | Brooks | 260—78 |

ALLAN LIEBERMAN, Primary Examiner

R. ZAITLEN, Assistant Examiner

U.S. Cl. X.R.

264—211